United States Patent [19]

Wanibuchi et al.

[11] Patent Number: 4,638,704

[45] Date of Patent: Jan. 27, 1987

[54] PRESS DEVICE HAVING MEANS TO ENABLE RAM AND BOLSTER TO BE REMOVED AS A UNIT

[75] Inventors: Hiroshi Wanibuchi; Akira Kubota, both of Tokyo, Japan

[73] Assignees: Kabushiki Kaisha Daini Seikosha; Kabushiki Kaisha Kuboto Tekkojo, both of Tokyo, Japan

[21] Appl. No.: 528,533

[22] Filed: Sep. 1, 1983

[51] Int. Cl.⁴ .............................................. B26F 1/02
[52] U.S. Cl. ...................................... 83/628; 83/637; 83/698; 100/282
[58] Field of Search ................. 83/563, 635, 637, 628, 83/698; 72/481; 100/282, 918

[56] References Cited

U.S. PATENT DOCUMENTS 1,052,082  2/1913  Miltner ................................. 100/282
4,014,232  3/1977  Mauger ............................. 83/563 X Primary Examiner—James M. Meister
Attorney, Agent, or Firm—Robert E. Burns; Emmanuel J. Lobato; Bruce L. Adams

[57] ABSTRACT

A press device comprises a securing member for detachably securing a plate to a body, and a coupling member detachably provided at a part of a driving transmitting portion. The plate, ram, struts and bolster are detachable from the body together.

4 Claims, 1 Drawing Figure

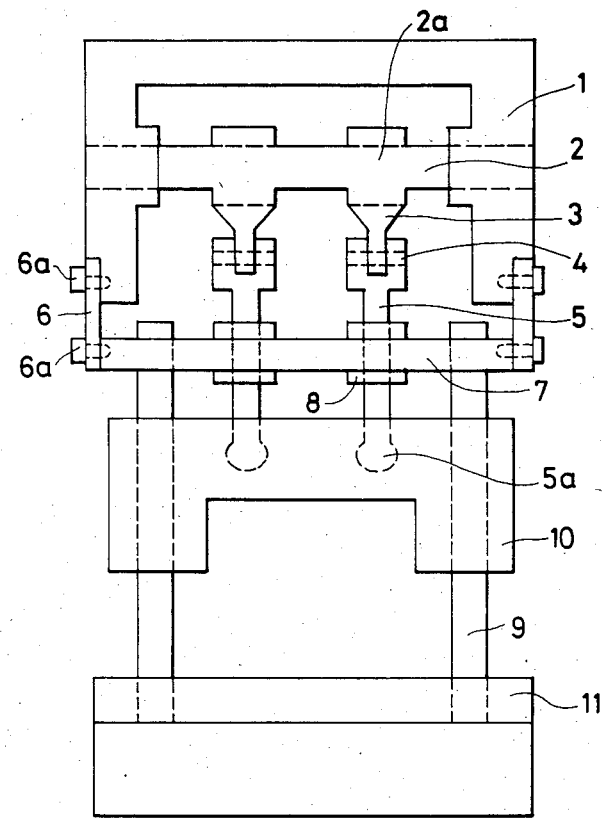

PRESS DEVICE HAVING MEANS TO ENABLE RAM AND BOLSTER TO BE REMOVED AS A UNIT

BACKGROUND OF THE INVENTION

The present invention relates to an improvement in a press device, and more particularly to a device in which a ram and a bolster are detachable as a unit from a body together with a main plate and struts.

Conventionally, various devices for simultaneously executing multi-process press operations by one stroke have been used. However, the horizontal eccentric force which is strongly applied during the multi-process simultaneous press operations causes cutting tools and struts thereof to be easily damaged. In a die-set system, particularly, numerous expensive metal molds are used and are liable to be damaged. On the other hand, in a device with strengthened struts, if the accuracy of the struts and the accuracy of a plate, ram or bolster through which the struts pass is lowered, the whole device needs to be replaced by a new one since the struts which are secured to a body of the device are non-detachable.

BRIEF SUMMARY OF INVENTION

It is an object of the invention to provide a press device with higher strength and accuracy and with easier maintenance and, in which a plate is detachably secured to a main body, and in which a part of a driving force transmitting portion which transmits a turning movement of a crank shaft into a vertical movement of a ram is detachably constructed, in order to detach the plate, struts, ram and bolster as a unit from the main body.

BRIEF DESCRIPTION OF THE DRAWING

The FIGURE is a schematic side elevation showing an embodiment of the present invention.

DESCRIPTION OF THE PREFERRED EMBODIMENTS

In the FIGURE, numeral 1 is a frame or main body, 2 is a crank shaft turnably secured to the body 1, 3 are connecting shafts turnably provided on eccentric portions 2a of the crank shaft 2, 4 are coupling pins, 5 are slide-type connecting members vertically driven the turning movement of the connecting shafts 3 by way of the coupling pins 4, 6 are securing members secured to the main body 1 by screws 6a, 7 is a plate secured to the body 1 by the screws 6a by way of the securing members 6, 8 are bearings secured to the plate 7 for slidably supporting the connecting members 5, 9 are struts each of which has one end thereof to the plate 7, 10 is a ram pivotally secured to spherical ends 5a of the connecting members 5 and vertically driven along the struts 9, and 11 is a bolster or support member secured to the other end of the struts 9 and arranged opposite to the ram 10.

The eccentric portions 2a of the crank shaft 2, the connecting rods 3, the coupling pins 4, the connecting members 5, the bearings 8 and the spherical ends 5a constitute a driving force transmitting portion for transmitting the turning movement of the crank shaft 2 into a corresponding vertical movement of the ram 10. The bolster 11 is in one body with the body 1 together with the main crank shaft 2 and the plate 7, and drives a pair of press tools such as cutting dies (not shown) interposed between the ram 10 and the bolster 11.

Now the operation of the press device according to the present invention will be described. In accordance with the turning of the crank shaft 2, the connecting shafts 3 are vertically driven accompanied by the generation of a horizontal force transfer component by the eccentric portions 2a. Since, however, the connecting members 5 are coupled with the connecting rods 3 via the coupling pins 4 and are supported by the bearings 8, the connecting members 5 are vertically driven with little affect from the horizontal force transfer component. Since the ram 10 is driven via the spherical ends 5a of the connecting members 5, the ram 10 is vertically driven with a lesser horizontal force transfer component. The upper ends of the four struts 9 passing through each corner of the ram 10 are fixed to the plate 7 passing therethrough, and the lower ends of the struts 9 are fixed to the bolster 11 passing therethrough, whereby the struts 9 are sufficiently strong and accurate to function as guides for the ram 10.

Accordingly, as a practical matter there is little problem even if the press tools are secured to the ram 10 and the bolster 11 directly or by way of a shank, without using the metal mold of a die set.

Since the plate 7 is secured to the main body 1 by the screws 6a via the securing members 6, the plate 7, the struts 9, the ram 10 and the bolster 11 are detachable together as a unit if a part of the driving force transmitting portion is detached. When the coupling pins 4 are punched out by sliding, for example, the connecting members 5 can be separated from the connecting rods 3. Accordingly, even if the accuracy of the vertical movement of the ram 10 is lowered, the assembly including the struts 9 can be extracted as a unit to undergo an overhaul by removing the securing members 6 and the coupling pins 4.

As illustrated, according to the present invention, the plate 7 secured to the main body is detachable, and detachable coupling members are used as a part of the driving force transmitting portion for transmitting the turning movement of the crank shaft to the vertical movement of the ram, whereby the plate, ram and bolster coupled with the struts are detachable together as a unit, and a press device suitable for multi-process simultaneous operations, with good strength and accuracy without using a die-set, and with excellent maintenance characteristic, can be provided.

Further, since the securing members of the plate act as a buffer of the force applied from the ram to the struts, the sturts are scarcely deformed and the accuracy of the press is improved.

What is claimed is:

1. In a press device having an upstanding main frame: a support member detachably disposed on a lower portion of the main frame; a plate member disposed at a middle portion of the main frame and having a plurality of openings extending therethrough; securing members detachably securing the plate member to the middle portion of the main frame; a plurality of upstanding struts connected at their bottom ends to the support member and at their top ends to the plate member; a ram mounted to undergo reciprocal sliding movement along the struts and coacting with the support member for performing a work-pressing operation during use of the press device; a plurality of connecting members slidably extending through respective ones of the plate member openings and having their lower ends connected to the ram; a turnable crank shaft turnably mounted on an upper portion of the main frame; and means detachably connected to the upper ends of the connecting members for converting the turning movement of the crank shaft into linear movement of the connecting members to thereby raise and lower the ram; whereby the plate member, connecting members, ram, support member and struts can all be detached from the main frame and removed therefrom as a single unit.

2. A press device according to claim 1; wherein the means detachably connected to the upper ends of the connecting members comprises coupling pins removably inserted into openings in connecting member upper ends.

3. A press device according to claim 2; wherein the lower ends of the connecting members have a spherical shape and are disposed in spherical openings in the ram.

4. A press device according to claim 1; including bearing means mounted on the plate member for slidably mounting the connecting members to undergo sliding movement in the plate member openings.

* * * * *